Dec. 9, 1924.

A. ANGELL, JR 1,518,891

POULTRY FEEDER

Filed Aug. 14, 1922

INVENTOR
ALBERT ANGELL JR.

By Arthur E Wallace Atty.

Patented Dec. 9, 1924.

1,518,891

UNITED STATES PATENT OFFICE.

ALBERT ANGELL, JR., OF WILMETTE, ILLINOIS, ASSIGNOR TO ROSENBAUM BROTHERS, INC., OF CHICAGO, ILLINOIS, A CORPORATION OF ILLINOIS.

POULTRY FEEDER.

Application filed August 14, 1922. Serial No. 581,803.

*To all whom it may concern:*

Be it known that I, ALBERT ANGELL, Jr., a citizen of the United States, residing at Wilmette, in the county of Cook and State of Illinois, have invented a new and useful Poultry Feeder, of which the following is a specification.

The present invention relates to feeding troughs and has particularly to do with poultry feeders.

Primarily, it is the object of the invention to provide an improved feeding trough out of which feed cannot readily be scattered, and to afford a novel means for suspending the feeder. Additionally, it is an object to provide a guard about a vessel containing feed which will prevent poultry from wasting the contents of the vessel upon the ground and at the same time serve to engage supports for said vessel. Further, it is an object to simplify the construction of a feed trough to permit of its manufacture at a low cost.

These, and such other objects as may hereinafter appear, are attained by the novel construction, combination and arrangement of parts of the device, as are hereinafter described. One sheet of drawings, illustrative of a single form of the invention, is hereto attached and made a part of this specification.

In the drawings.

Like reference characters are used to designate similar parts in the drawing and in the description which follows.

Figure 1:
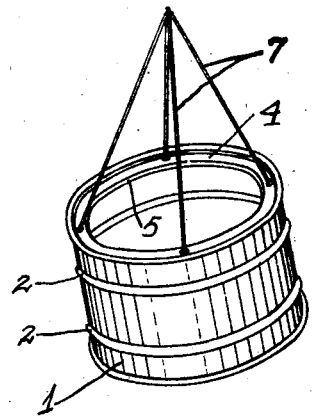
Figure 1 is a perspective view of the device.
Figure 2:
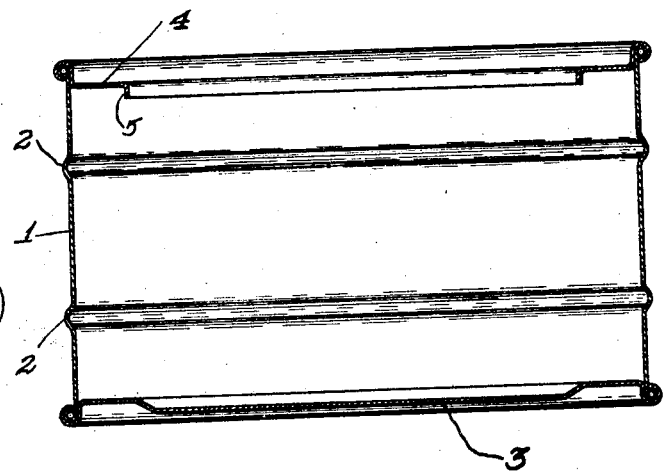
Figure 2 is a vertical section therethrough.
Figure 4:
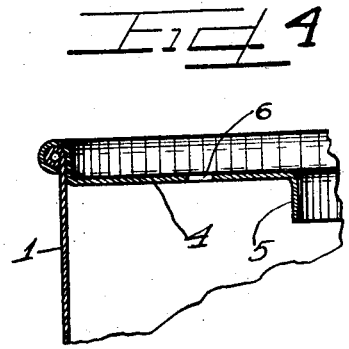
Figure 4 is a detail, in section, of the top or feed guard member.
Figure 3:
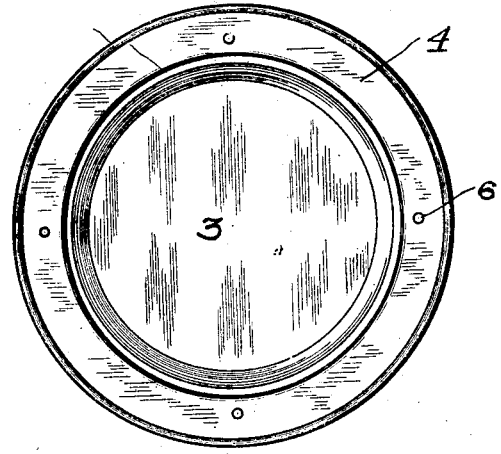
Figure 3 is a top plan view thereof.

As illustrated, the preferred form of the device comprises three parts, each of which may be stamped from suitable sheet material such as galvanized iron. While in the drawing a cylindrical type of feeder is disclosed, other shapes may be employed.

The ordinal 1 designates a cylinder of suitable height having parallel beadings or grooves 2 stamped therein. Said cylinder may be formed from a rectangular blank bent to shape and having its ends overlapped and joined in any suitable manner.

Cylinder 1 is provided with a generally flat bottom 3 which may be joined to said cylinder by "beating over," as is common in the art, and an apertured plate, cover or guard, 4, is affixed, in a similar manner, to the top of said cylinder.

Said plate or guard 4 has at its internal edge, a continuous depending flange 5 which is parallel to and concentric with the wall of cylinder 1.

In this manner, a vessel is provided to receive feed which vessel it is usual to fill to the upper beading or groove 2. Chickens or other poultry feeding therefrom may throw about, with their bills or feet, portions of the feed contents, but such portions are prevented from being scattered outside of the vessel, because, by striking the walls thereof, such portions are deflected against the top 4 thereof. Flange 5, which extends inwardly upon top 4, arrests further upward and outward movement of such portions, causing them to fall back into the vessel.

In order to suspend the device, which is usual in poultry feeding, a series of holes or apertures 6, regularly spaced one from another, are punched through the guard or lid 4. Cords or wires 7 passing through such holes may be arranged upon a hook or nail so that the device will be suspended above the ground. In the drawing, two cords or wires 7, one crossing the other, are attached at diametrically opposite apertures 6 in top 4. Said cords or wires may be adjusted upon the hook or nail to afford the vessel 1 being held in a level or in a tilted position, as is desired.

Each part, cylinder 1, bottom 3 or top 4 may be cut or stamped from sheet metal and may be readily bent into shape and for proper connection, one with another, providing an inexpensive and readily manufactured device.

What I claim as new and desire to obtain by Letters Patent of the United States, is:—

A receptacle for poultry feed comprising a relatively deep vessel having vertical walls, and a cover therefor comprising a two-flanged centrally apertured sheet of metal, the inner flange thereof being concentric with the walls of said vessel and depending thereinto to prevent the scattering of feed therefrom, the outer flange being secured to the rim of said vessel, said cover being provided with a plurality of regularly spaced apertures equidistant between said flanges and adapted to receive cord-like supporting members for suspending said vessel above the ground.

ALBERT ANGELL, Jr.